(12) United States Patent
Warren

(10) Patent No.: US 6,474,660 B1
(45) Date of Patent: Nov. 5, 2002

(54) RUNNER ATTACHMENTS FOR A SCOOTER

(76) Inventor: John F. Warren, 618 Country Lake Dr., St. Peters, MO (US) 63376-6902

( * ) Notice: Subject to any disclaimer, the term of this patent is extended or adjusted under 35 U.S.C. 154(b) by 0 days.

(21) Appl. No.: 09/748,764

(22) Filed: Dec. 22, 2000

(51) Int. Cl.[7] .............................................. B62K 13/00
(52) U.S. Cl. ...................... 280/7.12; 280/14.25; 280/26
(58) Field of Search .......................... 280/14.28, 14.21, 280/14.25, 14.27, 26, 7.14, 7.12, 8, 87.05, 87.041

(56) References Cited

U.S. PATENT DOCUMENTS

| | | | | |
|---|---|---|---|---|
| 628,433 A | * | 7/1899 | Finch | 280/11.27 |
| 791,343 A | | 5/1905 | Holtman | 280/13 |
| 1,128,698 A | * | 2/1915 | Levy | 280/10 |
| 1,209,398 A | | 12/1916 | Converse | 280/14 |
| 1,445,219 A | | 2/1923 | Larson | 280/7.12 |
| 1,477,513 A | | 12/1923 | McNeill | 280/8 |
| 1,576,426 A | | 3/1926 | Griffin | 280/8 |
| 1,658,068 A | * | 2/1928 | White | 280/14.25 |
| 2,198,667 A | * | 4/1940 | Hagenes | 280/87.042 |
| 2,352,966 A | | 7/1944 | Morando | 280/8 |
| 2,437,622 A | | 3/1948 | Stryker | 280/13 |
| 2,530,240 A | | 11/1950 | Graham | 280/13 |
| 2,950,924 A | | 8/1960 | Gantz | 280/14 |
| 3,153,543 A | * | 10/1964 | Magyar | 280/13 |
| 3,179,433 A | | 4/1965 | Flack | 280/8 |
| 3,321,211 A | | 5/1967 | Bryant et al. | 280/13 |
| 3,774,926 A | * | 11/1973 | Chase | 280/13 |
| 3,884,484 A | | 5/1975 | Uhlyarik | 280/7.12 |
| 4,059,168 A | | 11/1977 | House | 180/1 P |
| 4,116,455 A | | 9/1978 | Dotson et al. | 280/7.12 |
| 4,160,552 A | * | 7/1979 | Kupka | 280/14.21 |
| 4,194,753 A | * | 3/1980 | Schrishuhn, Jr. | 280/13 |
| 4,244,593 A | | 1/1981 | Malone | 280/8 |
| 4,521,029 A | | 6/1985 | Mayes | 280/7.14 |
| 4,537,412 A | * | 8/1985 | Hill | 280/14.1 |
| 4,790,550 A | | 12/1988 | Simpson | 280/87.04 A |
| 5,120,012 A | | 6/1992 | Rosenau | 248/201 |
| 5,407,217 A | * | 4/1995 | Lambert et al. | 280/10 |
| 5,413,361 A | * | 5/1995 | Mosher | 280/13 |
| 5,427,390 A | | 6/1995 | Duncan et al. | 280/8 |
| D364,127 S | | 11/1995 | Scherr et al. | D12/6 |
| 6,179,307 B1 | * | 1/2001 | Mao | 280/244 |

* cited by examiner

Primary Examiner—Avraham Lerner
Assistant Examiner—Paul Royal, Jr.
(74) Attorney, Agent, or Firm—Grace J. Fishel

(57) ABSTRACT

A pair of runner attachments for use in retrofitting an existing scooter into an all-season toy. The runner attachments having a runner on a lower side and are securely mounted on an upper side to the axle of the vehicle's wheel supports in a manner such that the runner is restrained from plowing into the snow or ice. The runners may be configured as a skate or ski.

4 Claims, 6 Drawing Sheets

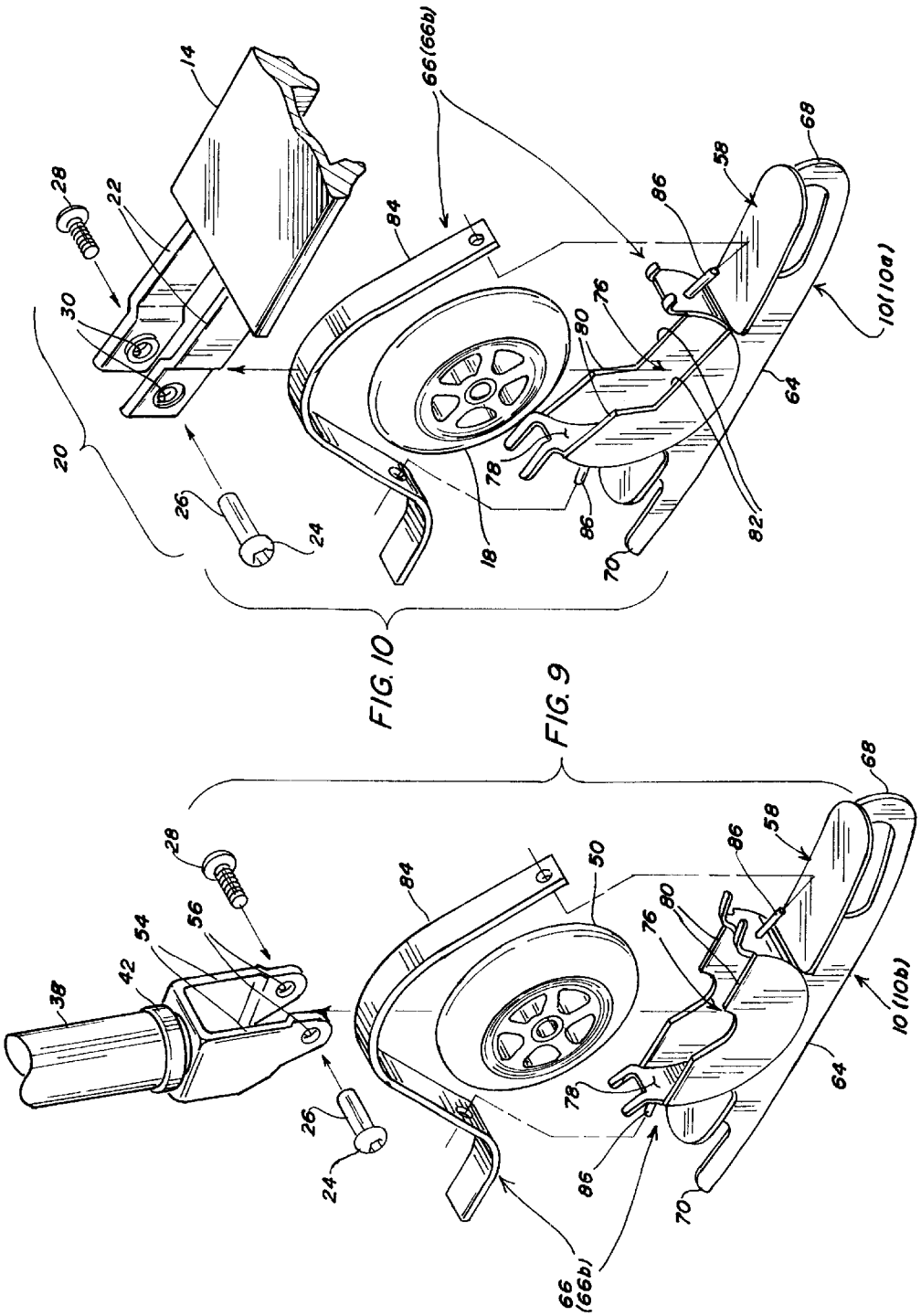

RUNNER ATTACHMENTS FOR A SCOOTER

BACKGROUND OF THE INVENTION

1. Field of the Invention

The present invention relates to a pair of runner attachments for use in converting a scooter, such as sold in the Great Scooter Craze of 2000, into a vehicle that can be used on snow or ice.

2. Brief Description of the Prior Art

An estimated 5 million scooters will be purchased in the United States in 2000. It would be desirable to retrofit these scooters into a vehicle that can be used on snow or ice, thus making them into an all-season toy.

Scooters previously retrofitted with skis differ structurally from the scooters which are currently popular. It is to the requirements of the current scooters that the present invention is addressed, safety being of importance.

BRIEF SUMMARY OF THE INVENTION

In view of the above, it is an object of the present invention to provide a pair of runner attachments for converting a currently popular scooter into an all-season toy. It is another object to provide a pair of runner attachments which can be securely attached to the scooter. It is also an object to provide a pair of runner attachments which are independently pivotable but which are stopped from accidentally plowing into the snow or ice and spilling a rider from the scooter. Other objects and features of the invention will be in part apparent and in part pointed out hereinafter.

A stand-up vehicle is retrofitted with a pair of runner attachments in accordance with the present invention. The vehicle is of a kind having a longitudinal horizontal footboard of such width as to support a foot of a rider with a first wheel support positioned at one end of the horizontal footboard in which is pinned at an axle generally in a plane of the horizontal footboard. A vertical steering column is positioned at an opposite end of the horizontal footboard and is pivotally connected thereto. The steering column has a steering handle at an upper end thereof and a second wheel support positioned at a lower end comprising a pair of ears between which an axle is pinned generally in the plane of the horizontal footboard.

Each of said runner attachments has a runner on a lower side and a means for mounting on an upper side, said means securely mounting the runner attachments to the axles of the vehicle and between the ears of the second wheel support. The runner attachments are long enough to contact an underside of the horizontal footboard when the runner attachment is pivoted about the axle in one direction whereby said runner attachments convert a stand-up vehicle into a vehicle mounted on runners and restrain the runners from plowing into the snow or ice.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 9 is an exploded perspective detail showing a runner attachment as shown in FIG. 8 being mounted on a lower end of a steering column; and, FIG. 10 is an exploded perspective detail showing a runner attachment as shown in FIG. 8 being mounted on a rear end of a horizontal footboard.

DETAILED DESCRIPTION OF THE INVENTION

Figure 4:
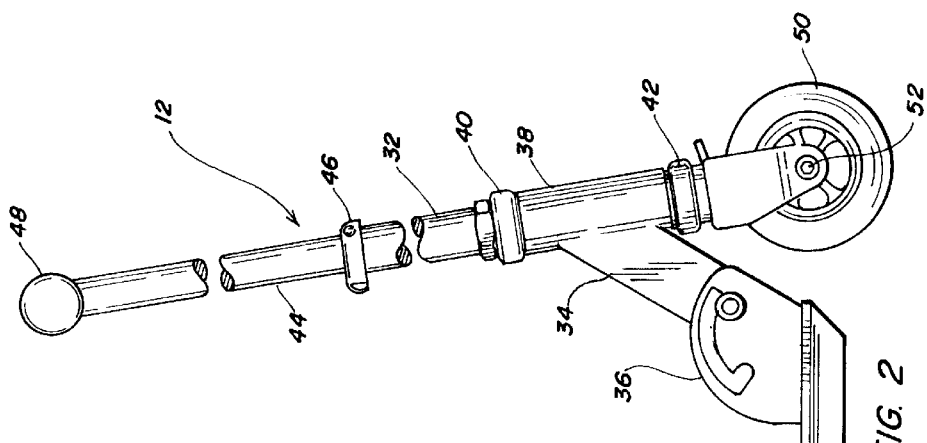
FIG. 4 is an exploded perspective detail showing a prior art rear wheel being removed from a rear end of a horizontal footboard.

Referring to the drawings more particularly by reference character, reference numeral 10 identifies a pair of runner attachments for converting a scooter 12 into a vehicle mounted on runners. As shown in FIG. 2, scooter 12 is a stand-up vehicle with a longitudinal horizontal footboard 14 of such width as to support a foot of a rider 16 (seen in FIG. 1). A first wheel 18 is positioned at one end of horizontal footboard 14 in a wheel support including an axle 20 generally in a plane of the horizontal footboard. As seen in FIG. 4, the rear end of horizontal footboard 14 terminates with a pair of generally horizontally extending ears 22 in which axle 20 is pinned. It will be understood that with other scooters 12, axle 20 may be pinned in a V-shaped slot or the like provided at the rear end of horizontal footboard 14. Axle 20 is formed from a specialized nut 24 with a threaded hollow tube extension 26 into which is received a bolt 28. Ears 22 have coaxial bores 30 formed therethrough and are spaced apart a distance sufficient to accommodate wheel 18 on axle 20.

Figure 3:
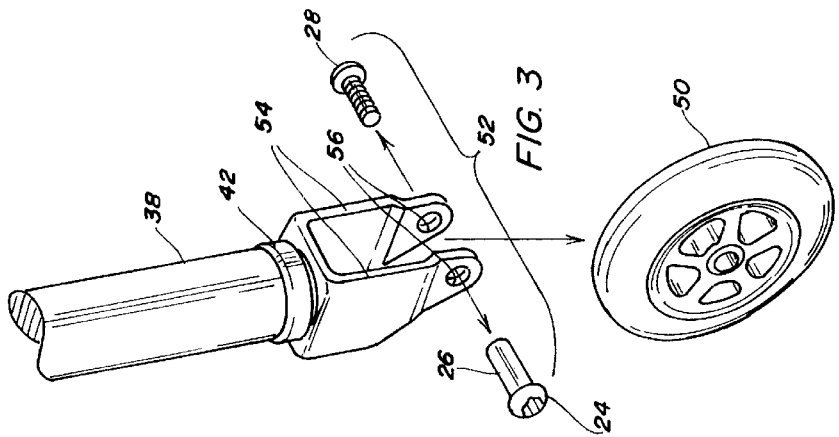
FIG. 3 is an exploded perspective detail showing a prior art front wheel being removed from a lower end of a steering column.

With continuing reference to FIG. 4, a vertical steering column 32 is positioned at an opposite end of horizontal footboard 14. Steering column 32 is pivotally connected to horizontal footboard 14 through a standard 34 which is hinged 36 to the footboard such that the steering column can be folded flat against the footboard. An upper end of standard 34 has a ferrule 38 into which steering column 32 is fastened with members 40, 42. Steering column 32 is preferably hollow at an upper end to receive an extension 44 which can be adjustably held in place with a clamp 46. This is for the purpose of adapting the height of steering column 32 to rider 16 who is to operate scooter 12. At the top of steering column 32 is a horizontal steering handle 48. A second wheel 50 is positioned in a wheel support at a lower end of steering column 32 including an axle 52 generally in the plane of horizontal footboard 14. As seen in FIG. 3, the lower end of steering column 32 terminates with a pair of generally vertically depending ears 54 in which axle 52 is pinned. Ears 54 have coaxial bores 56 formed therethrough and are spaced apart a distance sufficient to accommodate axle 52 which is formed in the same manner as axle 20.

Pair of runner attachments 10 are composed of first or rear runner attachment 10a and second or front runner attachment 10b. Runner attachments 10a and 10b have an upper side 60 and a lower side 62. A runner 64 is provided on lower side 62 and a means 66 for mounting runner attachment 10 to one of axles 20, 52 is provided on upper side 60. Means 66 mount runner attachment 10 such that the runner attachments are independently pivotable about axles 20, 52 as more particularly described below. As shown in FIG. 1 and FIG. 5–10, runner 64 is similar in configuration to ice skate blades, so that runners 64 are conveniently sharpenable by standard ice skate sharpening apparatus. It will be understood, however, that runner 64 may be configured as a ski with an elongated generally planar runner portion. In this connection U.S. Pat. Nos. 3,179,433 and 1,209,398 are incorporated by reference herein as showing runners formed as skis. Whether runner 64 is configured as a skate or a ski, it has an upturned front portion 68 to negotiate surface irregularities encountered when runner attachments 10 are in use. A rear portion 70 is also slightly curved upward to facilitate sideslipping of the runner on a surface during turning.

A first means 66a for mounting runner attachment 10 to one of axles 20, 52 is shown in FIGS. 1 and 5–7. Means 66a is a tang 72 attached to upper side 60. Tang 72 has a width at an upper end substantially the same as the thickness of first or second wheels 18, 50 which are removed from scooter 12 as shown in FIGS. 3 and 4. Tang 72 has an axial bore 74 for receipt of one of axles 20, 52 such that runner attachments 10 may be mounted on scooter 12 in place of wheels 18, 50. A plurality of vertically spaced axial bores 74 may be provided on tang 72 to facilitate mounting runner attachments 10 to various existing scooters 12 such that horizontal footboard 14 has enough clearance above a supporting surface that scooter 12 will glide over the surface. It will be understood that this distance may have to be greater when runner 64 is a ski and scooter 12 is for use in soft snow.

Figure 7:
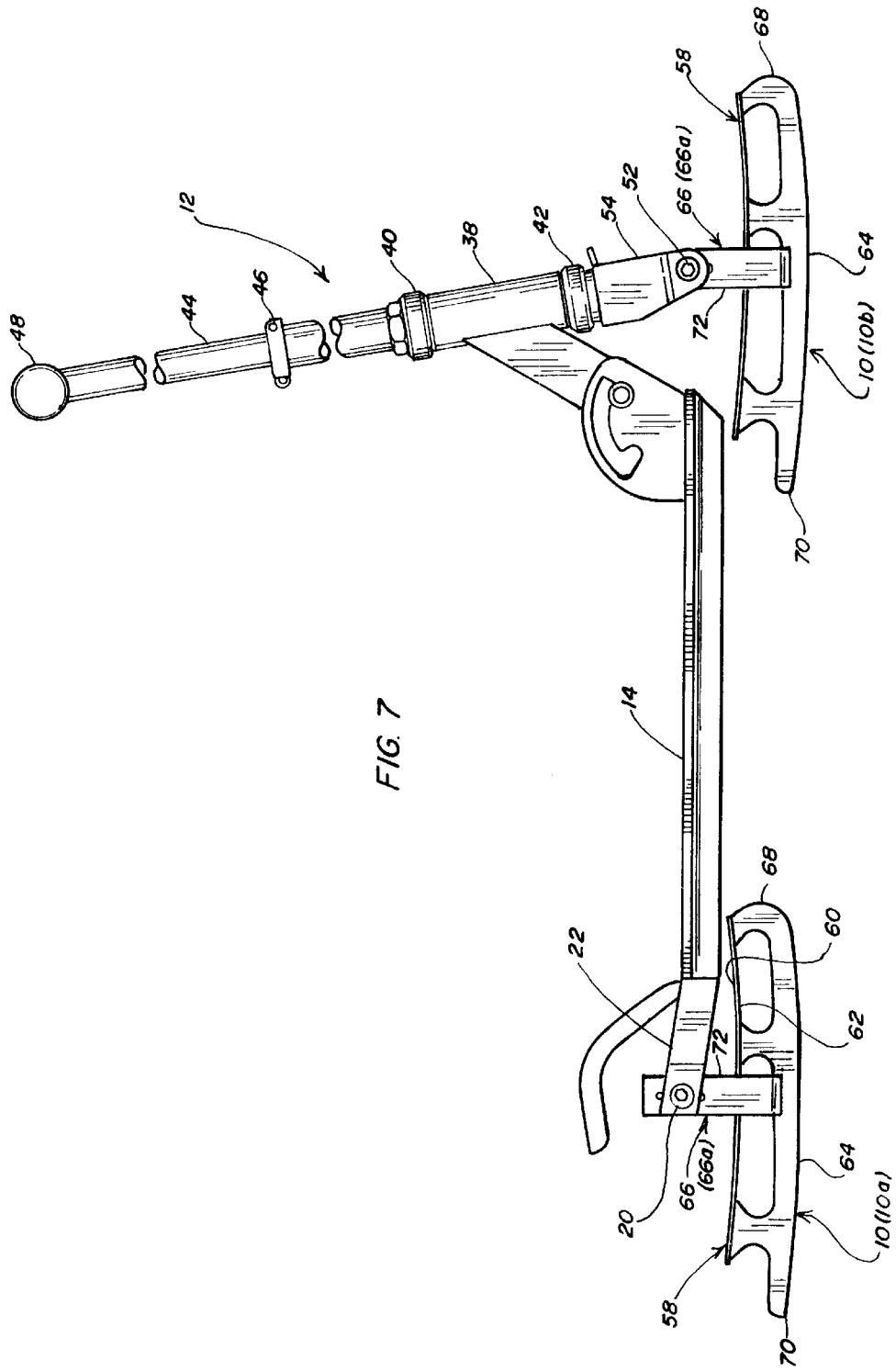
FIG. 7 is a side elevation of a scooter retrofitted with runner attachments in accordance with the present invention.

As best seen in FIG. 7, rear portion 70 of runner attachment 10b is long enough to contact an underside of horizontal footboard 14 when pivoted clockwise as viewed in the drawing. As illustrated, this contact may be made with a shoe 58 provided on upper side 60. This is a safety feature as it prevents front portion 68 of runner 64 from plowing into the snow or ice, causing scooter 12 to stop suddenly and rider 16 to fall. It will be seen that front portion 68 of rear runner attachment 10a is also long enough to contact an underside of horizontal footboard 14 when pivoted about axle 20 in one direction (i.e., counterclockwise as viewed in FIG. 7).

Figure 8:
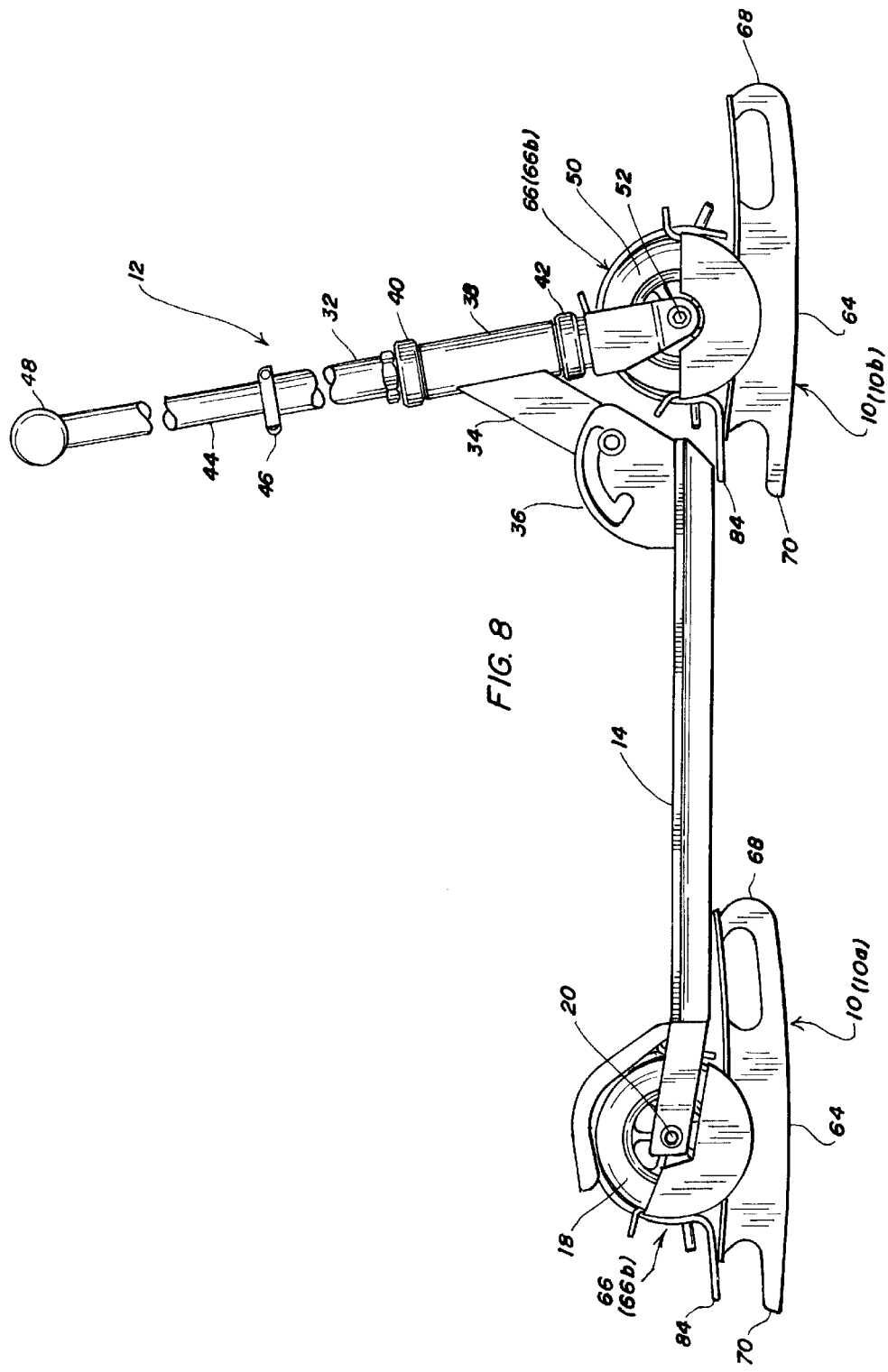
FIG. 8 is a side elevation of a scooter retrofitted with a second embodiment of the runner attachments in accordance with the present invention.

A second means 66b for mounting runner attachment 10 to one of axles 20, 52 is shown in FIGS. 8–10. As shown in these drawings, first and second wheels 18, 50 are not removed from scooter 12 (or if removed while runner attachments 10 are being installed on the scooter are then reattached to the scooter). Means 66b includes a generally semi-circular recess 76 on upper side 60 of runner attachment 10b. Recess 76 has a diameter substantially the same as that of one of wheels 18, 50. As illustrated in the drawings, recess 76 includes a longitudinally upwardly concave wheel engaging surface 78 which is integrally formed with side members 80, the latter members being vertically oriented. Side members 80 of runner attachment 10b may be notched 82 to provide relief for ears 22. A band 84 passes over each of wheels 18, 50 with opposite ends attached to upper side 60 for cinching the wheels into recess 76. As illustrated in the drawings, band 84 is an elastomeric member, opposite ends of which are pinned 86 to upper side 60. It will be understood, however, that band 84 may take other forms such as shown in U.S. Pat. Nos. 4,194,753, 3,774,926 and 3,321,211 which are incorporated by reference herein as showing bands for cinching wheels 18, 50 in recess 76.

Figure 1:
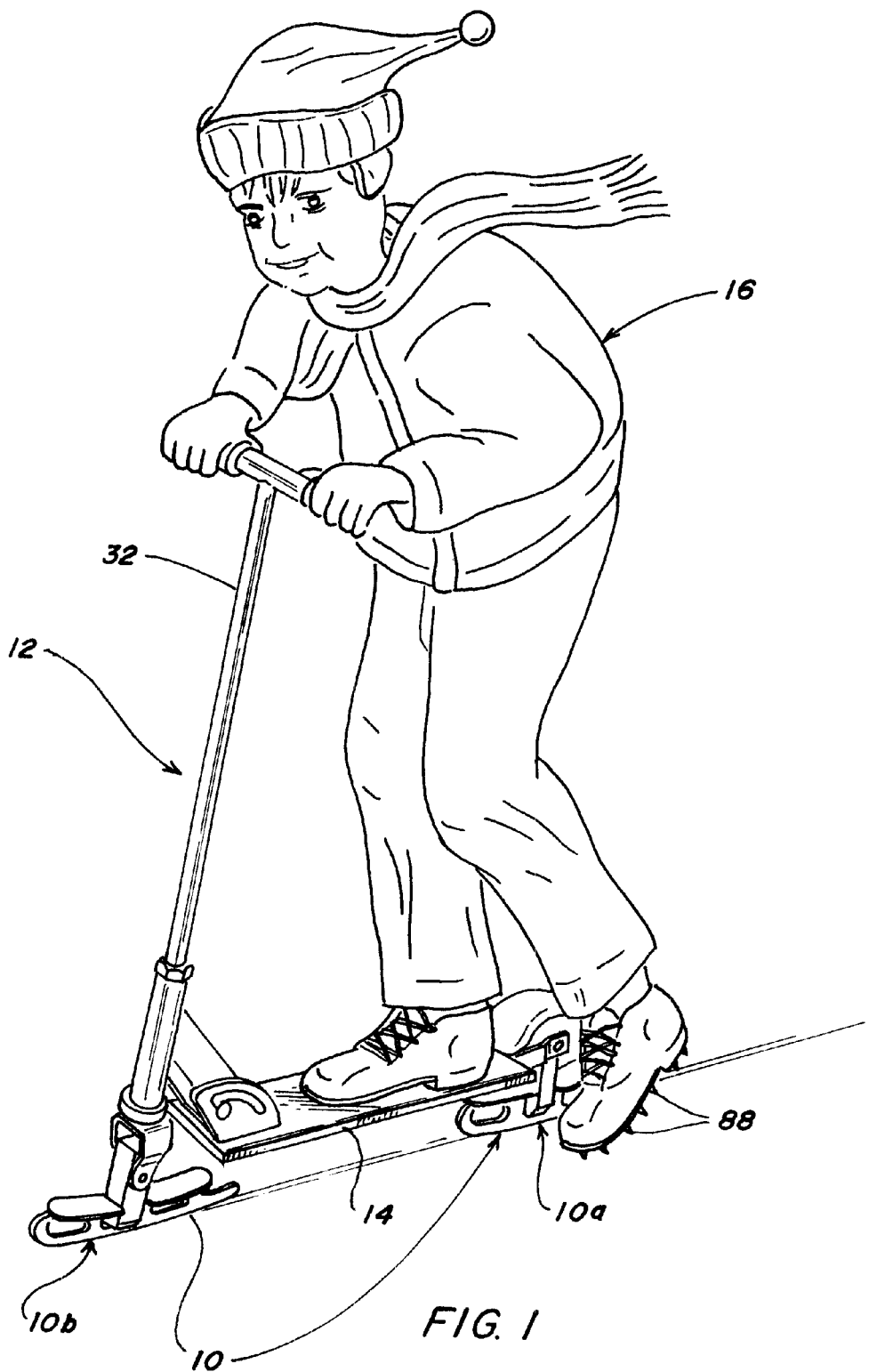
FIG. 1 is a perspective view of a scooter retrofitted with a pair of runner attachments in accordance with the present invention.
Figure 2:
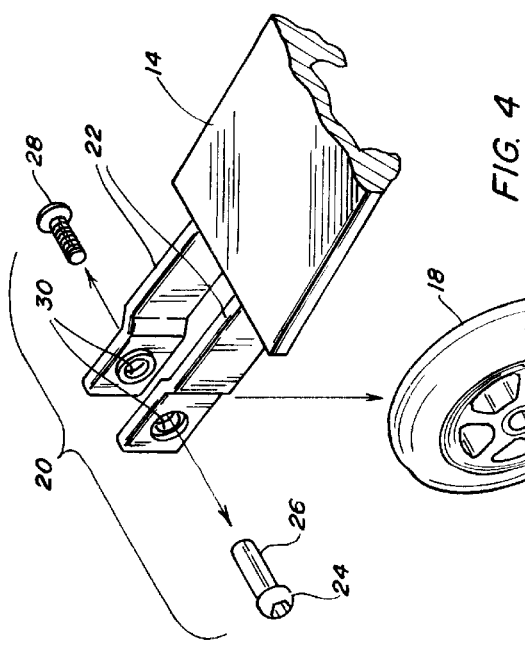
FIG. 2 is a side elevation of a prior art, currently popular scooter to be retrofitted in accordance with the present invention.
Figure 5:
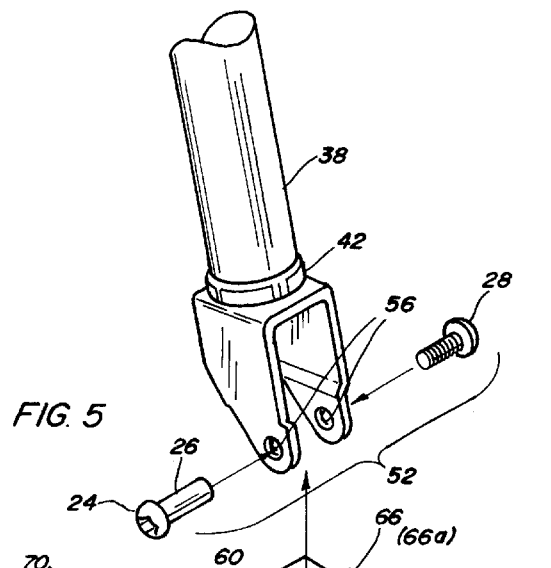
FIG. 5 is an exploded perspective detail showing a runner attachment being mounted on a lower end of a steering column.
Figure 6:
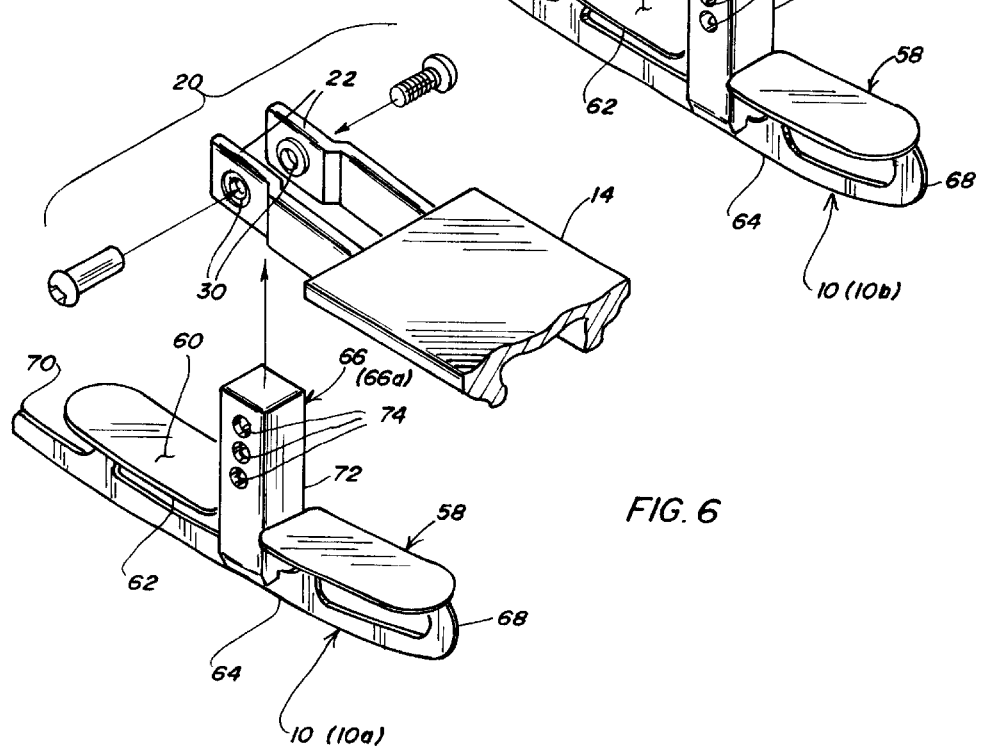
FIG. 6 is an exploded perspective detail showing a runner attachment being mounted on a rear end of a horizontal footboard.

Runner attachments 10 as shown in FIG. 1 are attached as shown in FIGS. 5–6 after wheels 18, 50 have been removed as shown in FIGS. 3–4. When nut 24 and bolt 28 have a socket head, an allen or other wrench (not shown) is needed for removing wheels 18, 50 and attaching runner attachments 10a. When runner attachments 10b are as shown in FIG. 8, wheels 18, 50 may be left on scooter 12. Wheels 18, 50 are slipped into recess 76 and cinched into the recess with band 84 as shown in FIGS. 9–10.

To operate scooter 12 on snow or ice (as shown in FIG. 1) with runner attachments 10 in place, rider 16 takes hold of steering handle 48 and puts one foot on horizontal footboard 14 directly behind standard 34 for steering column 32. With the other foot, he pushes himself forward. For this purpose when runner 64 is a skate, rider 16 may have cleats 88 on his shoes. A few strokes with the foot will cause scooter 12 to glide rapidly over the ice or snow so that rider 16 can place both feet on horizontal footboard 14 and coast until the momentum attained has spent itself and scooter 12 slows down or stops. The operation may then be repeated until sufficient speed is again attained to permit coasting.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A stand-up toy vehicle converted with a first and second runner attachment after the wheels have been removed, said converted vehicle for use on snow and ice and having a longitudinal horizontal footboard of such width as to support a foot of a rider, a wheel support positioned at a first end of the horizontal footboard in which is pinned a first axle generally in a plane of the horizontal support, a vertical steering column positioned at a second opposite end of the horizontal footboard and pivotally connected thereto, having a steering handle at an upper end thereof, and a wheel support positioned at a lower end comprising a pair of ears between which is pinned a second axle generally in the plane of the horizontal support, each of said runner attachments comprising a shoe with a tang on an upper side and a runner on a lower side, said tang having a bore by which it can be journaled on one of the axles of the vehicle in place of one of the wheels and having a width at an upper end substantially the same as the thickness of the wheel which has been removed, said first runner attachment attached to the rear of the horizontal footboard by the first axle, said second runner attachment attached to the steering column and having a runner with a front curved end and a rear end of the shoe long enough to contact an underside of the horizontal footboard when the shoe is pivoted about the second axle in one direction stopping the shoe at a low angle to the footboard such that the runner does not dig into the snow or ice.

2. The runner attachments of claim 1 wherein the runner is configured as a skate.

3. The runner attachment of claim where 1 in the runner is configured as a ski.

4. The vehicle of claim 1 wherein the tang on each runner has a plurality of vertically spaced bores.

* * * * *